(12) United States Patent
Zimmer

(10) Patent No.: US 7,200,758 B2
(45) Date of Patent: Apr. 3, 2007

(54) ENCAPSULATION OF A TCPA TRUSTED PLATFORM MODULE FUNCTIONALITY WITHIN A SERVER MANAGEMENT COPROCESSOR SUBSYSTEM

(75) Inventor: Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 813 days.

(21) Appl. No.: 10/268,855

(22) Filed: Oct. 9, 2002

(65) Prior Publication Data

US 2004/0073806 A1   Apr. 15, 2004

(51) Int. Cl.
*G06F 12/14* (2006.01)

(52) U.S. Cl. ......................................... 713/192; 726/22
(58) Field of Classification Search ................ 713/189, 713/192; 726/22
See application file for complete search history.

(56) References Cited

U.S. PATENT DOCUMENTS

| | | | |
|---|---|---|---|
| 5,850,450 A * | 12/1998 | Schweitzer et al. | 380/30 |
| 5,953,502 A * | 9/1999 | Helbig, Sr. | 726/24 |
| 6,185,678 B1 | 2/2001 | Arbaugh et al. | |
| 6,311,273 B1 | 10/2001 | Helbig, Sr. et al. | |
| 6,993,648 B2 * | 1/2006 | Goodman et al. | 713/2 |
| 2002/0004905 A1 | 1/2002 | Davis et al. | |
| 2002/0087877 A1 | 7/2002 | Grawrock | |
| 2002/0120575 A1 | 8/2002 | Pearsons et al. | |

FOREIGN PATENT DOCUMENTS

| | | |
|---|---|---|
| WO | WO 02/03196 | 1/2002 |
| WO | PCT/ US 03/37183 | 10/2003 |

OTHER PUBLICATIONS

Electronicstalk "Controller Cuts the Cost of Remote Management"□□www.electronicstalk.com/news/nat/nat178.html.*
"Trusted computing Platform Alliance—v1.1b" Online. Feb. 22, 2002, XP002304627. Retrieved from the internet: URL://http://www.trustedcomputinggroup.org/downloads/Main_TCG_Architecture_v1_1b.zip> 'retrieved on Nov. 8, 2004.

* cited by examiner

*Primary Examiner*—Gilberto Barron, Jr.
*Assistant Examiner*—Andrew L. Nalven
(74) *Attorney, Agent, or Firm*—Blakely, Sokoloff, Taylor & Zafman LLP

(57) ABSTRACT

A system for executing cryptographic services on a baseboard management controller separated from a main processor, with the baseboard management controller having isolated execution and memory with respect to the main processor. Cryptographic information is communicated between the baseboard management controller and the main processor to verify BIOS integrity and provide functionality consistent with Trusted Computer Platform Architecture.

21 Claims, 4 Drawing Sheets

ENCAPSULATION OF A TCPA TRUSTED PLATFORM MODULE FUNCTIONALITY WITHIN A SERVER MANAGEMENT COPROCESSOR SUBSYSTEM

FIELD OF THE INVENTION

This invention relates to the field of computer security. In particular, the invention relates to a system for protecting information on servers or personal computers through a secure boot process.

BACKGROUND

With the increasing reliance on electronic, web, or software agent based transactions, reliably determining identity of a computer acting on behalf of a particular computer user is becoming increasingly important. Many standards have been developed to allow authentication between various parts of a transactional chain that can extend from a user operating a personal computer, to a local network server, to gateway servers to Wide Area Networks or the internet, and eventually to a target computer. To be a "trusted platform" in a network, a computer must be trusted not to be subverted by preboot software programs that can alter transmitted hardware or software based identification or otherwise permit spoofing of other computer systems. The basis for this trust is a declaration by a known authority that the computer platform can be trusted for an intended purpose.

The Trusted Computing Platform Alliance (TCPA) offers one possible standard for identifying a user and a computer as trustworthy. In typical power-on operation in compliance with the standard, a separate hardware module (using cryptographic hashing techniques) queries the BIOS to determine if it can be trusted, and the BIOS queries the user to ensure that user is authorized to use the platform. The BIOS then interacts with the operating system (OS) loader and the hardware module to determine if the OS loader can be trusted. The OS loader transmits information to the OS kernel so that when the OS kernel loads it knows what software has had access to the system ahead of it. In effect this establishes that the computer system from that point forward is completely controlled by the OS kernel. If proper network authentication techniques are used, both the user and third parties can be confident that the computer is "trustworthy". Unfortunately, the additional cost of the separate hardware module and implementation concerns have limited widespread use of this or similar systems.

BRIEF DESCRIPTION OF THE DRAWINGS

The features and advantages of the present invention will become apparent from the following detailed description of the present invention in which.

DESCRIPTION

Figure 1:
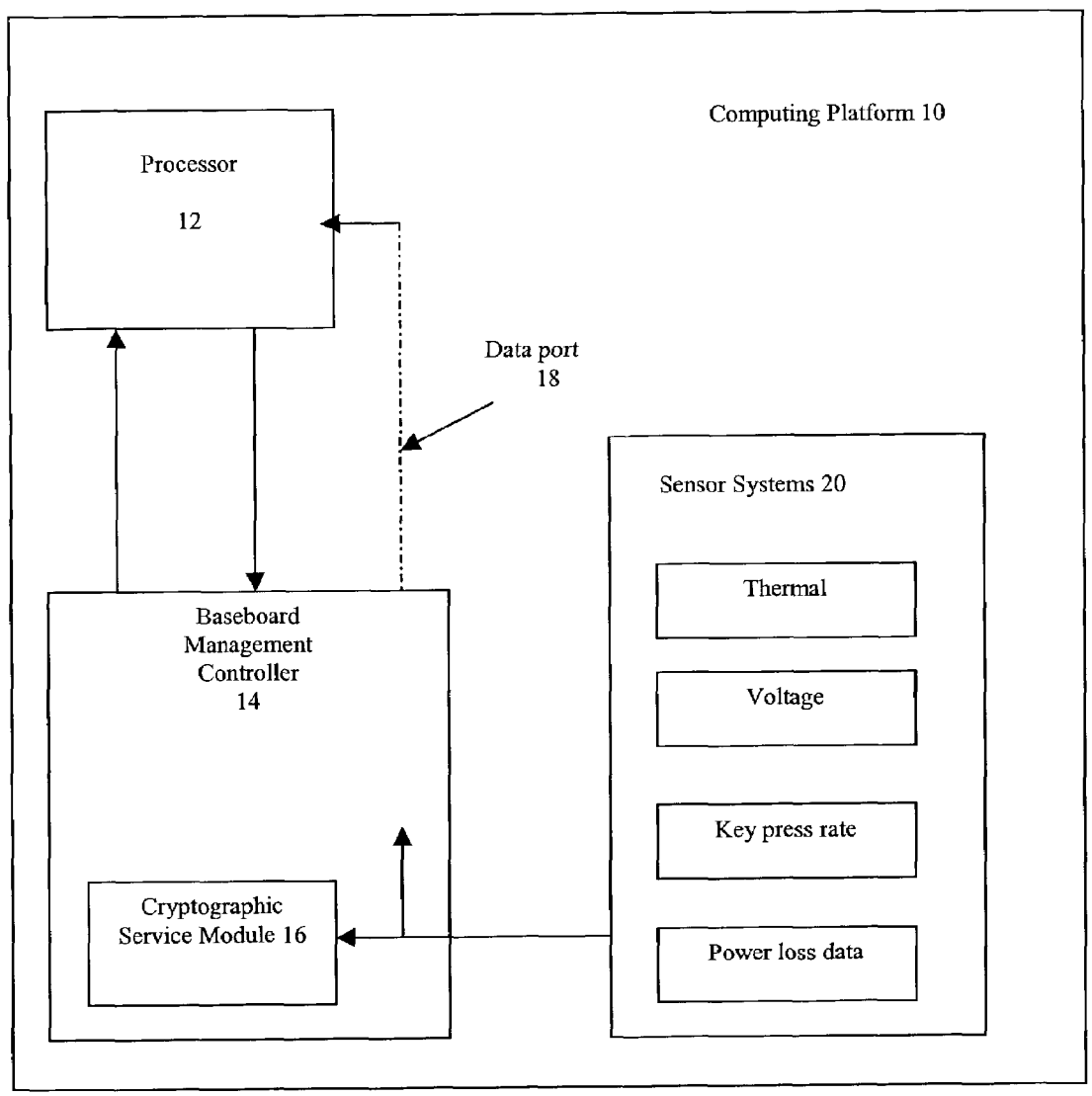
FIG. 1 is one embodiment of a computing platform having cryptographic services provided by a baseboard management controller.

As seen with respect to FIG. 1, a computing platform 10 includes a processor 12 suitable for executing programming code (including Basic Input/Output System (BIOS) instructions, operating system instructions, and application code) linked to a separate baseboard management controller. The link connection can be general information input/output lines, or alternatively be a dedicated data port 18. The baseboard management controller 14 also includes memory and/or logic supporting an internal cryptographic service module 16. In addition, the baseboard management controller 14 receives information from various sensor systems 20, which can include, but are not limited to, entropic data such as thermal and voltage levels, key press data, or power loss data.

In operation, cryptographic services are supported by the internal cryptographic service module 16 integrated with the baseboard management controller 14. The baseboard management controller has isolated execution and memory with respect to the main processor; and communicates cryptographic information between the baseboard management controller and the main processor to verify BIOS integrity. This allows enhanced protection of computing platform security through a more secure boot process that binds a segment of BIOS code to its platform and current configuration (e.g., hardware configuration within the platform).

As will be appreciated, computing platform 10 includes any product that performs operations for subsequent analysis and verification of the platform's boot process. Examples of a computing platform 10 include, but are not limited or restricted to a computer (e.g., desktop, a laptop, a server, blade server, a workstation, a personal digital assistant, etc.) or any peripherals associated therewith; communication equipment (e.g., telephone handset, pager, etc.); a television set-top box and the like. A "link" is broadly defined as a logical or physical communication path such as, for instance, electrical wire, optical fiber, cable, bus trace, or even a wireless channel using infrared, radio frequency (RF), or any other wireless signaling mechanism. In addition, the term "information" is defined as one or more bits of data, address, and/or control. "Code" includes software or firmware that, when executed, performs certain functions. Examples of code include an application, an applet, or any other series of instructions.

Typically, the baseboard management controller 14 manages the interface between system management software and the platform management hardware, provides autonomous monitoring, event logging, and recovery control, and serves as the gateway between system management software and supported bus systems interconnecting platform components. A baseboard management controller can be integrated into a variety of computing platforms that have different management features, and can include a single integrated component on a motherboard, or alternatively be represented by a distributed system collectively composed of multiple discrete controllers. For example, a complex, multiboard set in an enterprise-class server can use multiple management controllers for monitoring the different subsystems such as redundant power supply monitoring and control, RAID, expansion I/O, etc. In operation, the baseboard management controller 14 functions as policy agency that decides which processor to apply power-on reset to, when to assert INIT and NMI, etc. The usual inputs to effect policy decisions include measurement of physical integrity of hardware (i.e., error detection, BIST failures, key press data, non-responsive CPU's, etc) and state regarding earlier boots. The cryptographic module provides an additional policy variable, namely the cryptographic integrity the computing platform.

As will be further appreciated, a "cryptographic operation" is an operation performed to enhance data security through obfuscation, integrity protection and the like. Ideally, cryptographic operations are executed on an isolated computing engine whose processes can be trusted because they cannot be altered or easily replaced. Trusted processes can include protected storage, digital signature, and PKI (public key infrastructure) key support. Additionally, the cryptographic operations may include data protection, such as a key, and may involve binding or sealing an internally generated asymmetric key pair to a particular computing platform configuration. Other cryptographic operations can include hashing, namely a one-way conversion of information to a fixed-length representation that is referred to as a hash value. Normally, the "hash value" is substantially lesser in size than the original information. It is contemplated that, in some cases, the hashing may involve a 1:1 conversion. One type of hashing function is referred to as The Secure Hash Algorithm (SHA-1) as specified by The National Institute of Standards of Technology. In effect, various possible cryptographic operations supported by the cryptographic services module 16 can be used to enhance security of the computing platform by, for example, ensuring authenticity of BIOS images in ROM.

Figure 2:
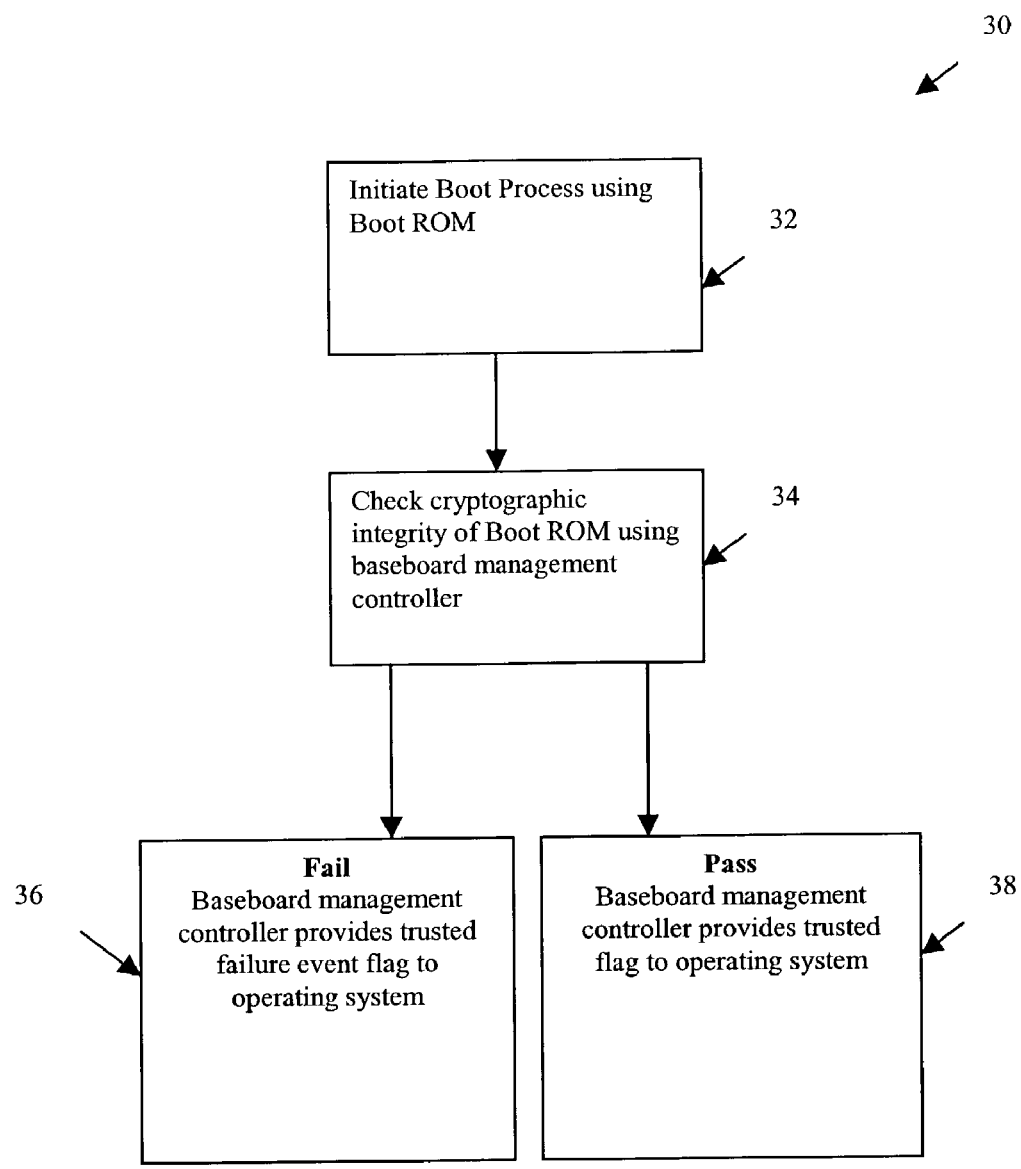
FIG. 2 is an embodiment supporting multiple processors and multiple BIOS images that utilizes Intelligent Platform Management protocols, an IPMI (Intel Platform Management Interface), and a compliant baseboard management controller.

FIG. 2 schematically illustrates a general process for implementing a cryptographic service module in a baseboard management controller such as described with reference to FIG. 1. The process 30 includes initiation of a boot process 32 with a cryptographic check 34 undertaken by the baseboard management controller to verify integrity of the BIOS image. If the cryptographic check is fails (box 36), the operating system is informed by an appropriate event flag that the security of the computing platform cannot be guaranteed. Conversely, if the cryptographic check is passed (box 38), the operating system is informed by an appropriate event flag that the security of the computing platform can be trusted.

Figure 3:
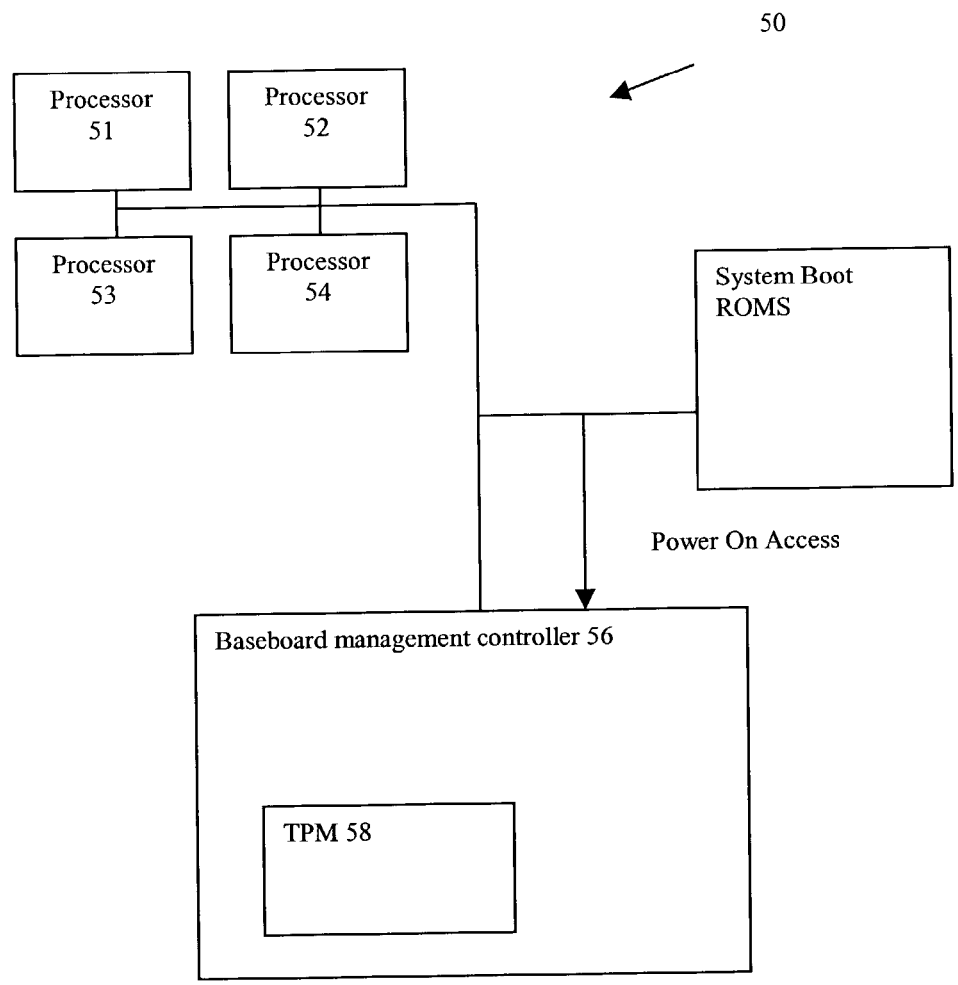
FIG. 3 illustrates a baseboard management controller supporting multiple processors.

As seen in FIG. 3, one specific embodiment 50 suitable for use in conjunction with a server management baseboard controller for multiple processors 51, 52, 53, and 54 that are optionally provided with multiple BIOS images is described. As seen in that FIGS., a server management baseboard controller, such as the IPMI (Intel Platform Management Interface) compliant Baseboard Management Controller 56 (BMC 56) in an Intel Standard High-Volume (SHV) server motherboard with the capabilities required by a TCPA (Trusted Computer Platform Architecture—www.trustedpc.org) 1.0-compliant system can be augmented with a trusted platform module 58 (TPM 58) as firmware executing on the BMC 56 to support cryptographic services.

As will be understood, IPMI compliant systems typically use Intelligent Platform Management (IPM) for autonomous monitoring and recovery features implemented directly in platform management hardware and firmware. The key characteristic of Intelligent Platform Management is that inventory, monitoring, logging, and recovery control functions are available independent of the main processors, BIOS, and operating system. Platform management functions can also made available when the system is in a powered down state. Platform status information can be obtained and recovery actions initiated under situations where system management software and normal 'in-band' management mechanisms are unavailable. The independent monitoring, logging, and access functions available through IPMI provide manageability built-in to the computing platform hardware. This can support systems where there is no system management software available for the particular operating system, or where the end-user elects not to load or enable the system management software.

IPMI is best used in conjunction with system management software running under an operating system. This provides an enhanced level of manageability by providing in-band access to the IPMI management information and integrating IPMI with the additional management functions provided by management applications and the operating system (OS). System management software and the OS can provide a level of sophisticated control, error handling and alerting, than can be directly provided by the platform management subsystem. IPMI is a hardware level interface specification that is 'management software neutral' providing monitoring and control functions that can be exposed through standard management software interfaces such as DMI, WMI, CIM, SNMP, etc.

As a hardware level interface, IPMI sits at the bottom of a typical management software stack atop the BMC 56. The BMC 56 manages the interface between system management software and the platform management hardware, provides autonomous monitoring, event logging, and recovery control, and serves as the gateway between system management software and the IPMB and any other bus systems commonly available (e.g. Intelligent Chassis Management Bus (ICMB)). IPMI supports the extension of platform management by connecting additional management controllers to the system using the IPMB. The IPMB is an $I_2C$-based serial bus that is routed between major system modules. It is used for communication to and between management controllers. This provides a standardized way of integrating chassis features with the baseboard. Because the additional management controllers are typically distributed on other boards within the system, away from the 'central' BMC, they are sometimes referred to as satellite controllers. By standardizing the interconnect, a baseboard can be readily integrated into a variety of chassis that have different management features. IPMI's support for multiple management controllers also means that the architecture is scalable. A complex, multi-board set in an enterprise-class server can use multiple management controllers for monitoring the different subsystems such as redundant power supply monitoring and control, RAID, expansion I/O, etc. While an entry-level system can have all management functions integrated into the BMC. IPMI also includes 'low-level' $I_2C$ access commands that can be used to access 'non-intelligent' $I_2C$ devices (devices that don't handle IPMI commands) on the LPC or other private busses accessed via a baseboard management controller.

The TPM 58 executing in an IPMI compliant environment such as described can guarantee security since execution is hidden and storage shrouded from the main microprocessor complex (IA32 or IPF family SMP). In effect the private memory and hardware resources of a TPM 58 module supported by the BMC 56 precludes viruses, errant drivers, and other untrusted code executing on the main microprocessor complex from compromising secrets of the TPM. These secrets include cryptographic keys, hashes of executed code, etc. Implementation on the BMC 56 of a TPM 58 adds security capability to SHV platforms while minimizing expenses attendant to separate TPM specific coprocessors.

The communication to the TPM 58 via its subsystem encapsulation can be via tunneling the TCPA command set within the IPMI protocol or by having the coprocessor export an additional command-data port that is exclusively reserved for TCPA messaging. The former is preferred in that it does not necessitate hardware changes for early-generation systems that adopt this hybrid capability of server management and security co-processor. Also, the tamper-proof requirement of TCPA can be satisfied by the system vendor augmenting the physical enclosure of the coprocessor to indicate if an unauthorized party attempts to compromise the physical integrity of the subsystem.

The TPM 58 has modest nonvolatile storage requirements (a minimum of 8 kbyte). Also, cryptographic services in a TPM are not time-critical and can be implemented in software (i.e., the TPM is to store secrets and secret processing, such as signing digests, whereas bulk encryption like SSL is done by main microprocessors), thus allowing a server management co-processor to be augmented with these capabilities. Also, security metrics, such as key-press rate, voltages, and other entropy-related data that a TPM 58 can use and collect are currently collected by the BMC 56, and the information passed on the TPM 58 (i.e., the BMC measures temperatures and voltages for purposes of alarming). This entropy collection (such as temperature sensor readings) allows for improved Random Number Generation (RNG) as compared to arithmetical software implementations of pseudorandom number generators. Also, since a TPM needs to both be aware of and track power-losses the BMC 58 must track power loss data and actually qualify the power-on-good signals to the microprocessor complex.

Figure 4:
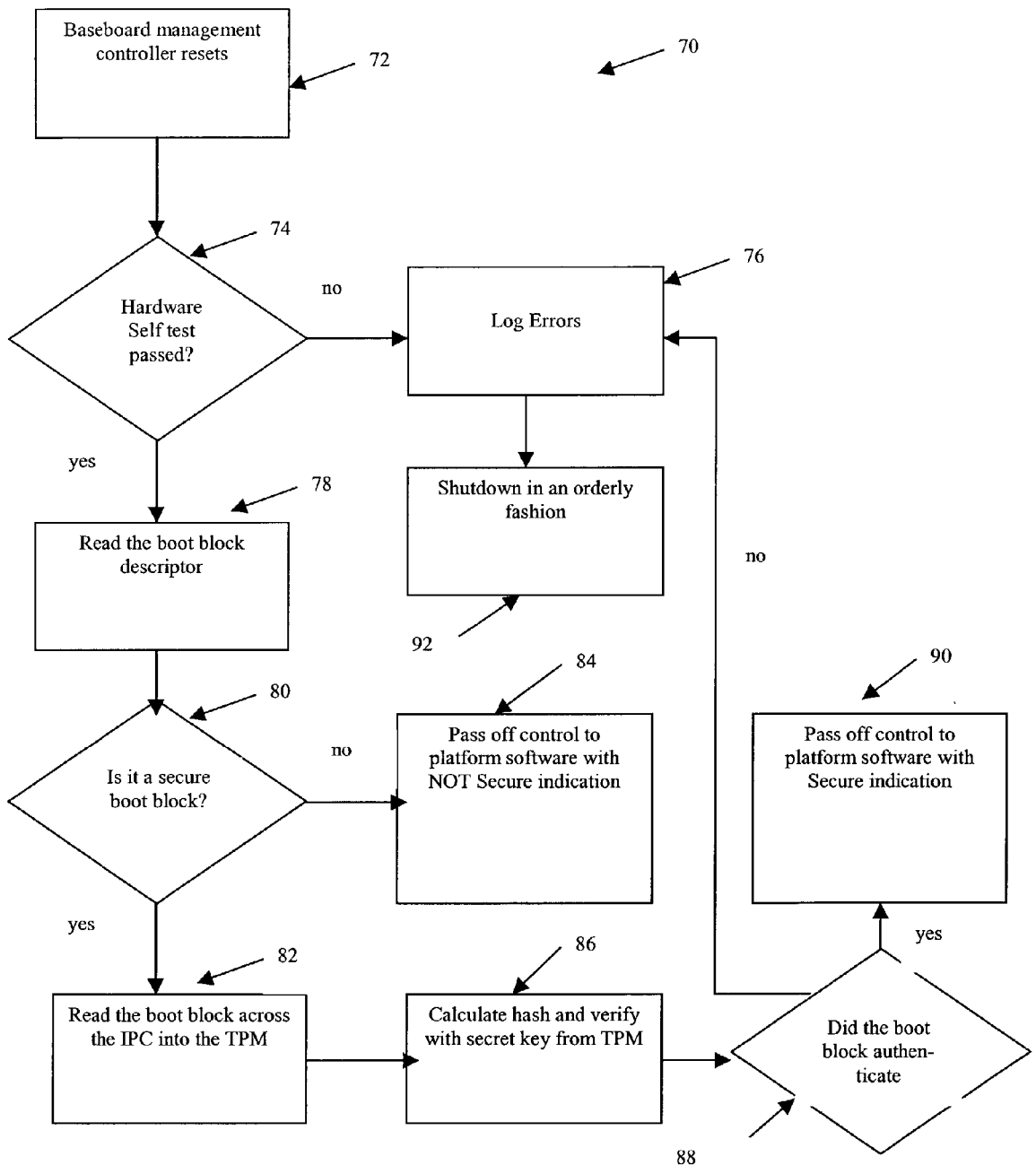
FIG. 4 illustrates a process for implementing a cryptographic service module in a baseboard management controller system.

FIG. 4 specifically illustrates a general process 70 for implementing a cryptographic service module in a baseboard management controller system such as described with reference to FIG. 3. After initial reset (72) of the BMC (first) and boot system, a hardware self test (74) is performed. Assuming success, the boot block descriptor is tested (80) to see if it forms a part of a secure (trusted system). If it is, the boot block is read into the TPM (82), and hashing or other cryptographic services are performed to verify BIOS integrity (86). If it is authenticated (88), an authenticated (secure) status is sent to the operating system (90), otherwise the failure is logged (76). Alternatively, the boot process can fail if the hardware self test fails (76 and 90), or a "not secure" status flag can be passed to the operating system (84) if the computing platform is not part of a trusted system. The BMC is the primary agent here in that it controls the power-on reset signaling to the main CPU complex, so it can perform this authenticate process of the boot-block even prior to the first code-fetch from the main CPU (i.e., don't take main CPU's out of reset until authenticate logic done in the slower BMC/TPM microprocessor). In effect, a security qualification of the asserting these control lines to the main CPU's is put into place.

Software implementing the foregoing methods and system can be stored in the memory of a computer platform or system as a set of instructions to be executed. In addition, the instructions to perform the method and system as described above could alternatively be stored on other forms of machine-readable media, including flash memory, magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compressed or executable version.

Alternatively, the logic to perform the methods and systems as discussed above, could be implemented in additional computer and/or machine readable media, such as discrete hardware components as large-scale integrated circuits (LSI's), application-specific integrated circuits (ASIC's), or firmware such as electrically erasable programmable read-only memory (EEPROM's); or spatially distant computers relaying information through electrical, optical, acoustical and other forms of propagated signals (e.g., radio waves or infrared optical signals).

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly, it is the following claims including any amendments thereto that define the scope of the invention.

The invention claimed is:

1. A method comprising:
   executing cryptographic services on a baseboard management controller separate from a processor, with the baseboard management controller having a cryptographic service module and both isolated execution and memory with respect to the processor, the cryptographic service module in communication with sensor systems; and
   communicating cryptographic information between the baseboard management controller and the processor to verify Basic Input/Output System (BIOS) integrity.

2. The method of claim 1, further comprising connecting multiple processor to the baseboard management controller.

3. The method of claim 1, further comprising verifying multiple BIOS images.

4. The method of claim 1, further comprising collecting entropy data via the baseboard management controller to provide security metrics.

5. The method of claim 1, further comprising calculating a cryptographic hash of a boot-block via the baseboard management controller to detect an untrustworthy BIOS image.

6. The method of claim 1, further comprising retaining a secret key in isolated memory via the baseboard management controller.

7. An article of manufacture comprising a machine-reliable medium having instructions which when executed, cause a machine to:
   execute cryptographic services on a baseboard management controller separate from a processor, with the baseboard management controller having a cryptographic service module and both isolated execution and memory with respect to the processor, the cryptographic service module in communication with sensor systems; and communicating communicate cryptographic information between the baseboard management controller and the processor to verify Basic Input/Output System (BIOS) integrity.

8. The article of manufacture of claim 7, wherein the instructions which when executed, further cause the machine to connect multiple processors to the baseboard management controller.

9. The article of manufacture of claim 7, wherein the instructions which when executed, further cause the machine to verify multiple BIOS images.

10. The article of manufacture of claim 7, wherein the instructions which when executed, further cause the machine to collect entropy data via the baseboard management controller to provide security metrics.

11. The article of manufacture of claim 7, wherein the instructions which when executed, further cause the machine to calculate a cryptographic hash of boot-block to detect an untrustworthy BIOS image.

12. The article of manufacture of claim 7, wherein the instructions which when executed, further cause the machine to retain a secret key in isolated memory via the baseboard management controller.

13. A system comprising:
    a cryptographic services module executable on a baseboard management controller separate from a processor, with the baseboard management controller having a cryptographic service module and both isolated execution and memory with respect to the processor, the cryptographic service module in communication with sensor systems; and
    a data pathway for communicating cryptographic information between the baseboard management controller and the processor to verify Basic Input/Output System (BIOS) integrity.

14. The system of claim 13, wherein the baseboard management controller is connected to multiple processors.

15. The system of claim 13, wherein the data pathway is further to verify multiple BIOS images.

16. The system of claim 13, wherein the baseboard management controller is further to collect entropy data to provide security metrics.

17. The system of claim 13, wherein the baseboard management controller is further to calculate a cryptographic hash of the boot-block to detect an untrustworthy BIOS image.

18. The system of claim 13, wherein the broadband management controller is further to retain a secret key in isolated memory.

19. The method of claim 1, wherein the sensor systems comprise entropy data including one or more of thermal data, voltage data, key press rate data, and power loss data.

20. The article of manufacture of claim 7, wherein the sensor systems comprise entropy data including one or more of thermal data, voltage data, key press rate data, and power loss data.

21. The system of claim 13, wherein the sensor systems comprise entropy data including one or more of thermal data, voltage data, key press rate data, and power loss data.

* * * * *